(No Model.)
R. BROOKS.
PROCESS OF TREATING THE WASTE OF SALT FISH.
No. 299,515. Patented June 3, 1884.
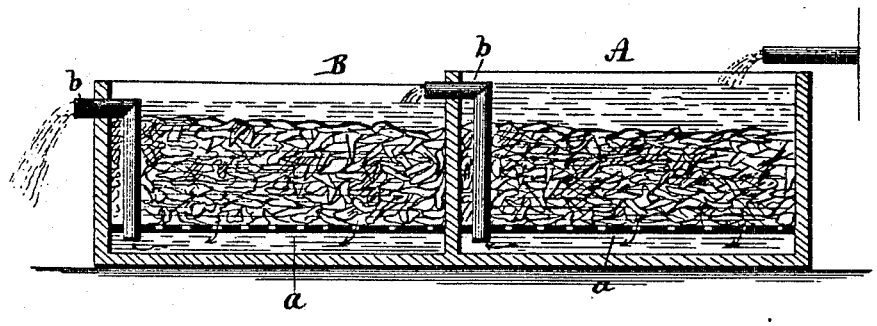
WITNESSES
INVENTOR
Attorney

United States Patent Office.

REUBEN BROOKS, OF GLOUCESTER, MASSACHUSETTS, ASSIGNOR TO THE RUSSIA CEMENT COMPANY, OF SAME PLACE.

PROCESS OF TREATING THE WASTE OF SALT FISH.

SPECIFICATION forming part of Letters Patent No. 299,515, dated June 3, 1884.

Application filed March 3, 1884. (No specimens.)

*To all whom it may concern:*

Be it known that I, REUBEN BROOKS, of Gloucester, in the county of Essex and State of Massachusetts, have invented certain new and useful Improvements in the Process of Treating the Waste of Salt Fish; and I do hereby declare the following to be a full, clear, and exact description of the invention, such as will enable others skilled in the art to which it appertains to make and use the same.

My invention relates to an improvement in the method of extracting glue from fish-waste. In preparing salted fish for market, by removing the skins and bones large quantities of waste material are produced, nearly six thousand tons of waste being made in the city of Gloucester each year, and very large amounts being made in all other places where the business is carried on. This "waste," as it is termed, consists, mainly, of bones with more or less adherent flesh, the fins, the tails, and the skins. The whole mass, being thoroughly impregnated with salt, is useless for any purpose except as a fertilizer, unless the salt can be removed. The skins, being comparatively easy to desalt, have hitherto been used in the manufacture of glue, for the treatment of which Letters Patent have already been granted in several instances; but as the skins form only about one-fifth of the bulk of the entire mass of waste, the greater portion still finds no market except for use as a fertilizer. The waste is therefore, in practice, separated by the fish-skinner into two portions, one portion—the skins—being sold to the glue-makers at a much higher price than the other portion, which latter is used only for fertilizing purposes. This latter portion, forming the great bulk of the whole, consists of bones of all sizes and thickness, from the small bones of the fins and tail, scarcely thicker than paper, to the larger portions of the backbone, often nearly two inches in thickness, mingled with pieces of flesh and fragments of skins. It is therefore practically impossible to remove the salt from this mass of material by the ordinary process of soaking in water, as long before the salt is out of the larger bones the smaller bones will become putrid and the whole mass spoiled for any use except as a fertilizer.

Hitherto the salt has been removed from the above-described waste by treating it with dilute sulphuric acid without subjecting it to a preparatory crushing process; but, although the use of the acid will admit of the waste remaining longer in water without decomposing, the process is objectionable on account of the cost of the acid and the difficulty experienced in removing the acid from the minute cells of the bones, since, if the acid be not entirely removed, it will have a very injurious effect upon the product.

The object of my present invention is to provide an effective method of desalting fish-waste, whereby time will be saved and the use of chemicals dispensed with, except, perhaps, in the very warm weather.

With this end in view my process consists, first, in mechanically disintegrating or pulverizing the waste; secondly, in subjecting the disintegrated or pulverized mass to the action of water or very dilute sulphuric acid, or other antiseptic; and, thirdly, extracting the glue therefrom by any approved means, preferably in the manner described in Letters Patent No. 243,713, granted Le Page July 5, 1881. The process of disintegrating or pulverizing may be accomplished by any suitable machinery, the object being to so tear, crush, or otherwise reduce the waste that all portions of the mass may be acted upon by the water with nearly or quite the same rapidity, and thus prevent the liability of putrefaction. I find it convenient in practice to use rotary cutters for the above purpose, the cutters consisting of cylinders provided with saw-teeth set in opposite directions upon the two cylinders, so that one of the cylinders, revolving rapidly, will tear the material into small pieces, while the other cylinder, revolving slowly, will feed the material. A speed of about nine hundred revolutions per minute for the cutter-cylinder will give very good results, reducing the bones to minute fragments and tearing the fins and tails into shreds. I make no claim, however, to any particular machine for this purpose in my present application. The material, after being disintegrated, is subjected to the action of water, or very dilute acid or other antiseptic, until the salt is entirely removed. This may be accomplished by placing the material in a wire basket or other perforated receptacle, which is itself suspended in a suitable tank containing water, the water being changed from time to time until the desalting process is complete. From one to three per cent. of sulphuric acid mixed with the water will materially diminish the danger of decomposition. But the operation may be greatly facilitated and use of chemicals entirely dispensed with if the tanks are so situated as to permit a constant stream of water to flow in at the top over the material and percolate down through the mass, being discharged from the bottom, carrying the salt with it. To secure this action of water in an economical manner, the tanks may be constructed in the manner shown in the accompanying drawings, in which A B, &c., represent a series of tanks, each succeeding tank being somewhat lower than the preceding. Each tank is provided with a perforated receptacle, a, retained at a short distance from the bottom of the tank, and with a discharge-pipe, b, as shown. A stream of fresh water flowing into the tank A passes down through the mass contained in the perforated receptacle, becoming partially saturated with salt, and passing into the chamber between the bottom of the tank and the perforated bottom of the receptacle. From thence the water will pass through the discharge-pipe b into the second tank whenever the water in the tank A has reached a sufficient height. The water, in passing through the mass in the second tank, becomes further saturated with salt, and passes through the second discharge-pipe, b, into the third tank in the same manner as just described, or may run to waste, if deemed expedient. The more tanks in a series the greater the economy of water, until the water shall have become fully saturated with salt. When the material in the tank A is perfectly desalted, it is removed from the tank to the cookers or other apparatus used to extract the glue, and the partially desalted material in the tank B is put in the tank A, a new supply of salt material being placed in B. One important advantage of this method of applying the water is that the water, having taken a portion of salt from the material with which it first came in contact, and becoming thereby of greater specific gravity, is constantly passing on down through the mass, taking up more salt on its course and at the same time removing at once from the tank all impurities which it has taken into solution from the mass.

In desalting material by the old process of soaking in water which is only changed at intervals of several hours, it is necessary to constantly agitate the material in the tank, as otherwise the lower portion would not become desalted as fast as the upper portion, owing to the greater specific gravity of the water which is more fully saturated with salt, which causes the same to settle to the bottom; but even when the material is so agitated there is still considerable danger of its becoming tainted in the tanks, especially during the last stages of the operation, when material that is almost desalted is stirred up with water in which it has been soaking for several hours, as many of the impurities which are washed out from the waste are held in solution, and, if not promptly removed, are liable to decompose and so taint the whole mass as to render it unfit for the manufacture of glue.

I am aware that tanks have heretofore been constructed for leaching chemicals in which liquids flowing in at the top were drawn off from the bottom in a manner similar in many respects to that above described, and hence I make no claim to tanks so constructed in my present application; but, Having fully described my invention, what I claim as new, and desire to secure by Letters Patent, is—

1. The process of preparing the waste portions of salt fish for the manufacture of glue, consisting in, first, crushing, tearing, or otherwise mechanically disintegrating the waste, and, secondly, removing the salt therefrom by the use of water or dilute sulphuric acid, substantially as set forth.

2. The process of preparing the waste portions of salt fish for the manufacture of glue, consisting in, first, crushing, tearing, or otherwise mechanically disintegrating the waste, and, secondly, removing the salt therefrom by exposing the waste to the action of flowing water, substantially as set forth.

3. The process of preparing the waste portions of salt fish for the manufacture of glue, consisting in, first, crushing, tearing, or otherwise mechanically disintegrating the waste, and, secondly, removing the salt therefrom by exposing the waste to the action of flowing water, said water passing downward through the mass, and leaving the material through which it has passed by the pressure of the water in the tank, substantially as set forth.

4. The process of extracting glue from the waste of salt fish, consisting in, first, mechanically disintegrating the waste; secondly, removing the salt therefrom by the use of flowing water, or water with an antiseptic in solution; thirdly, cooking; fourthly, straining, and, fifthly, evaporating, substantially as set forth.

5. The process of extracting glue from the waste of salt fish, consisting in, first, mechanically disintegrating the waste; secondly, removing the salt therefrom by the action of flowing water or dilute sulphuric acid; thirdly, steaming the desalted mass; fourthly, straining, and, fifthly, evaporating, substantially as set forth.

In testimony whereof I have signed this specification in the presence of two subscribing witnesses.

REUBEN BROOKS.

Witnesses:
JAMES DAVIS,
SUMNER D. YORK.